United States Patent [19]

Prudhomme

[11] Patent Number: 4,517,082

[45] Date of Patent: May 14, 1985

[54] ADVANCED DUAL-FILTERING APPARATUS

[76] Inventor: Malcolm J. Prudhomme, P.O. Box 510, Sunset, La. 70584

[21] Appl. No.: 432,009

[22] Filed: Sep. 30, 1982

[51] Int. Cl.³ .............................................. B01D 23/20
[52] U.S. Cl. .................................... 210/117; 210/136; 210/167; 210/238; 210/440; 210/443; 210/DIG. 8
[58] Field of Search ............... 210/767, 805, 806, 167, 210/168, 241, 232, 238, 136, 443, 444, DIG. 8, DIG. 17, 117–119, 440

[56] References Cited

U.S. PATENT DOCUMENTS

| | | | |
|---|---|---|---|
| 2,149,956 | 3/1939 | Damrow | 210/DIG. 8 |
| 2,477,404 | 7/1949 | Butt | 210/DIG. 8 |
| 2,733,815 | 2/1956 | Kwochka | 210/DIG. 8 |
| 3,159,095 | 12/1964 | Wagner | 210/DIG. 8 |
| 3,308,956 | 3/1967 | Yee | 210/232 |
| 3,319,790 | 5/1967 | Lindberg | 210/232 |
| 3,400,824 | 9/1968 | Weimer | 210/DIG. 8 |
| 3,481,478 | 12/1969 | Williams | 210/443 |
| 3,759,388 | 9/1973 | Thomason | 210/DIG. 8 |
| 3,849,312 | 11/1974 | Wecker | 210/DIG. 8 |
| 4,113,623 | 9/1978 | Koether | 210/167 |
| 4,128,478 | 12/1978 | Metzger | 210/167 |
| 4,282,094 | 8/1981 | Mitchell | 210/167 |

Primary Examiner—Ernest G. Therkorn
Attorney, Agent, or Firm—Keaty & Keaty

[57] ABSTRACT

A filtering system for deep fat fryers includes a filter tub for receiving contaminated oil from fat frying vats, a primary filtering means mounted in a covering relationship to bottom wall of said tub, and a fine filter cannister to effect removal of contaminated particles down to at least 1/10 of a micron in size from said oils.

12 Claims, 7 Drawing Figures

FIG. 7

ADVANCED DUAL-FILTERING APPARATUS

BACKGROUND OF THE INVENTION

1. FIELD OF THE INVENTION

The present invention relates to an oil filtration apparatus for filtering oils, especially edible oils and fats, including cooking oil, as are prevalent in deep fat frying operations commonly employed wherever food is prepared for relatively large numbers of persons, such as restaurants, hospitals, and other similar institutions, of undesirable and sometimes rancid impurities, including very small micron-sized particles, thereby enabling said oil to be re-used two or three times with no sacrifice in its quality.

2. BACKGROUND AND SUMMARY OF THE INVENTION

There presently exists several devices for continuously filtering or purifying cooking oil and other edible oils and fats employed in deep fat frying operations, wherein the oil is generally pumped through a filtering system which filters out much of the crumbs or the like which frequently drop off of the food being cooked during the cooking operation and accumulate on the bottom of the deep fat fryer, which presents sanitary and aesthetic problems and which adversely affects the cooking operation by means of causing a degradation or decomposition of the cooking oil into its fatty acid components, which darkens the cooking oil and the food being cooked therein, resulting in undesirable taste and odors being transferred to said food. The fatty acids in the residues in the oil or shortening, in addition to scorching and the adverse effects thereof, react in the shortening or oil to cause and greatly accelerate oxidation and/or general breaking down and degradation thereof, thereby greatly reducing the useful life thereof for cooking purposes (i.e. as a viable medium of heat transfer). Representative of the prior art within this field of invention are U.S. Pat. Nos. 3,477,361; 3,483,982; 3,759,388; and 3,880,757. These filtering systems of the prior art basically work in the following simple manner:

First, all of the oils and/or fats, particle of food, flour and seasoning, which accumulated in the deep frying vat during the cooking process, are drained into a filter tub, which has a single ply of filter paper in the bottom. The oil or fat is then vacuumed out of the tub and back into the cooking vat through this single ply of filter paper, thereby removing only larger particles twenty micron and above in size. That is why, after three or four days of cooking in the oil or fat, these particles of micron size accumulate in the oil and burn from high temperature, gradually turning the oil and food dark in color and causing it to look and taste bad. However, none of these references suggest the specific combination taught by the present invention, which combination features several major advantages/improvements thereover. The results produced by the present invention have been long sought after by those skilled in the art, but until the advent of this invention, these results have been unobtainable. The present invention features a dual-filtering system which works in a similar manner, but after the oil leaves the filter tub, it is pressure-pumped upwardly into the bottom part of a second filter cannister (called the void). This action causes more particles to separate and settle, thus leaving only the very small micron-sized particles which are suspended in the oil to enter a filter element mounted within said cannister. This novel filter element is made of highly refined, uniform, very dense and absorbent paper approved by USDA and FDA for use in filtering edible oils and fats. When the cooking oil reaches the bottom of the filter element and is forced upwardly through several inches of this tightly-wound paper, which strips the oil of all contaminants down to 1/10 of a micron in size or as small as tobacco smoke, which renders the oil or fat free of all harmful contaminants. However, the apparatus of the present invention further comprises quick connect/disconnect hoses to facilitate bypassing of the upflow second filter element just described, thereby effecting easy conversion to the single filter element system common to the prior art, when such is desirable.

The present invention basically comprises:

1. A filter tub or enclosure of conventional construction (i.e. a bottom wall with upwardly extending, enclosing side walls), preferably made of stainless steel or any other suitable, easy-to-clean metal;

2. A screen filter element having a plurality of blisters or bubbles, placed on the bottom of said enclosure, thereby providing an increased surface area for filtering the cooking oils or fats contained by said enclosure, thereby enhancing the filtering and purification thereof;

3. A paper filter element placed on top of said screen element, for facilitating removal of micron-sized particles from said cooking oils and/or fats;

4. A retainer ring securably mounted in fluidly sealing relationship to the bottom of said enclosure, which it is made to conform with, over said screen filter element and said paper filter element, thereby securing said filter elements to the bottom surface of said enclosure;

5. A combination vacuum/pressure pump disposed adjacent to said enclosure;

6. A fine filtering assembly mounted, by means of a bracket attached to a side wall of said enclosure, upstream of said enclosure, wherein said fine filtering assembly comprises a generally cylindrical cannister having a lower void area and an upper void area, and a tightly-wound paper filter element mounted therein between said upper and lower void areas in fluidly sealing engagement thereto, wherein said paper filter element is composed of highly refined, uniform, very dense, and absorbent paper approved by USDA and FDA for use in filtering edible oils and fats;

7. A cap mated in pressure-sealing relationship to the top of said cannister, wherein said cap comprises a downwardly extending member having outwardly directed bevels wedged into the top portion of said tightly-wound paper filter element;

8. Inlet and outlet means integral to said cannister for facilitating the intake and exhaust of said cooking oils and fats therewithin and therewithout, respectively;

9. A drain or sump provided on the bottom surface of said filter tub;

10. First conduit means connecting said drain to said combination vacuum/pressure pump for conveying said oils or fats from said filter tub to said pump;

11. Second conduit means connecting said pump to said inlet means of said cannister;

12. Third conduit means connected on one end to said outlet means of said cannister and preferably having nozzle means at its other (i.e. opposite) end for directing said oils or fats into any suitable destination, which is generally cooking vats disposed in the immediate vicinity of said filter tub;

13. Roller means fixedly attached to said filter tub, thereby making said filter tub mobile, thereby facilitating the easy movement thereof to any desired location;

14. Energization means for energizing said pump, for activating said dual-filtering apparatus of the present invention, which operates in the following manner:

a. used, at least partially decomposed, dirtied, hot cooking oils and/or fats, are emptied or poured from said deep frying vats into said filter tub;

b. energizing said pump with said energization means, thereby causing said pump to first vacuum said oils and/or fats through said paper filter element and said screen filter element which are secured to the bottom of said filter tub, and thence through said drain and said first conduit means into said pump—this filtering process effects the removal from said oils and/or fats of all solid particles (e.g. flour, cornmeal, fat from the food being deep fried in the vats) down to about twenty--thirty microns in size;

c. the pressure side of said pump then forces or conveys said oils and/or fats, which are now partially filtered, upwardly through said second conduit means and said inlet means of said cannister, and through said lower void area of said cannister, wherein by the natural action of downward gravitational force, much of the contaminates suspended in the oils and/or fats settle out of the flowing stream thereof; the pressure supplied by said pump is sufficiently strong to drive said oils and/or fats upwardly through said novel tightly-wound paper filter element mounted within said cannister, which is a specially formulated blend of different types of paper, rolled with just enough pressure to achieve a certain tightness between plies to effect removal of all solid particles from said oils and/or fats down to 1/10 of a micron in size, thereby substantially purifying said oils and/or fats for re-use;

d. the now purified or filtered oils and/or fats (which are now suitable for cooking purposes—i.e. are now a viable heat transfer medium) are thence delivered or conveyed through said outlet means of said cannister and through said third conduit means fluidly connected thereto, and through said nozzle means thereof, to any suitable destination, which is generally the deep frying vats for re-use in deep frying operations—it should be noted that this filtering apparatus of the present invention increases the useful life of said cooking oils and/or fats by two to three times, thereby ultimately resulting in increased efficiency of operation and reduction in the cost of operation commensurate with the cost of the cooking oil saved;

e. said filter tub is preferably constructed of stainless steel, thereby facilitating the easy and effective cleaning thereof, by means of, for example, hot water and a clean hand towel (no soap as this can contaminate and degrade the cooking oil), thereby rendering said filter tub fit for subsequent re-use. Further, said filter elements therein and said filter element mounted within said cannister are preferably disposable and are easily replacable. Disposable filters are favorable over washable filters, because if washable filters are not properly cleaned, the oil may be damaged rather than helped by filtration. Additionally, the dual-filtering apparatus of the present invention possesses the capability of being readily convertible into a single-filtering apparatus, similar to (but improved over) the devices commonly found in the prior art. However, the dual-filtering, upflow system of the present invention provides many inherent advantages or benefits over any of the devices of the prior art, particularly:

i. the upflow, fine filtering assembly, hereinabove described, facilitates the removal of fine, contaminate particulates down to 1/10 of a micron in size, vis-a-vis twenty to thirty microns as is possible with the devices of the prior art, thereby resulting in a cooking oil which is much more purified and fit to cook with, thereby ultimately resulting in better-tasting and much more sanitary, nutritious food;

ii. the screen filter element mounted below the paper element within the bottom of the filter tub, is novel, in that it comprises bubbles which hold it off of the bottom of the filter tub, thereby providing an increased surface area for filtering said cooking oils and/or fats;

iii. said quick connect/disconnect hoses which facilitate easy conversion to the single-filtering system prevalent in the prior art;

iv. the apparatus of the present invention is cost-effective, simple to operate, and is much more efficient than the devices provided in the prior art.

Many other objects and advantages of the present invention will become obvious from the following detailed description when taken in conjunction with the accompanying drawings, wherein:

DETAILED DESCRIPTION

Figure 1:
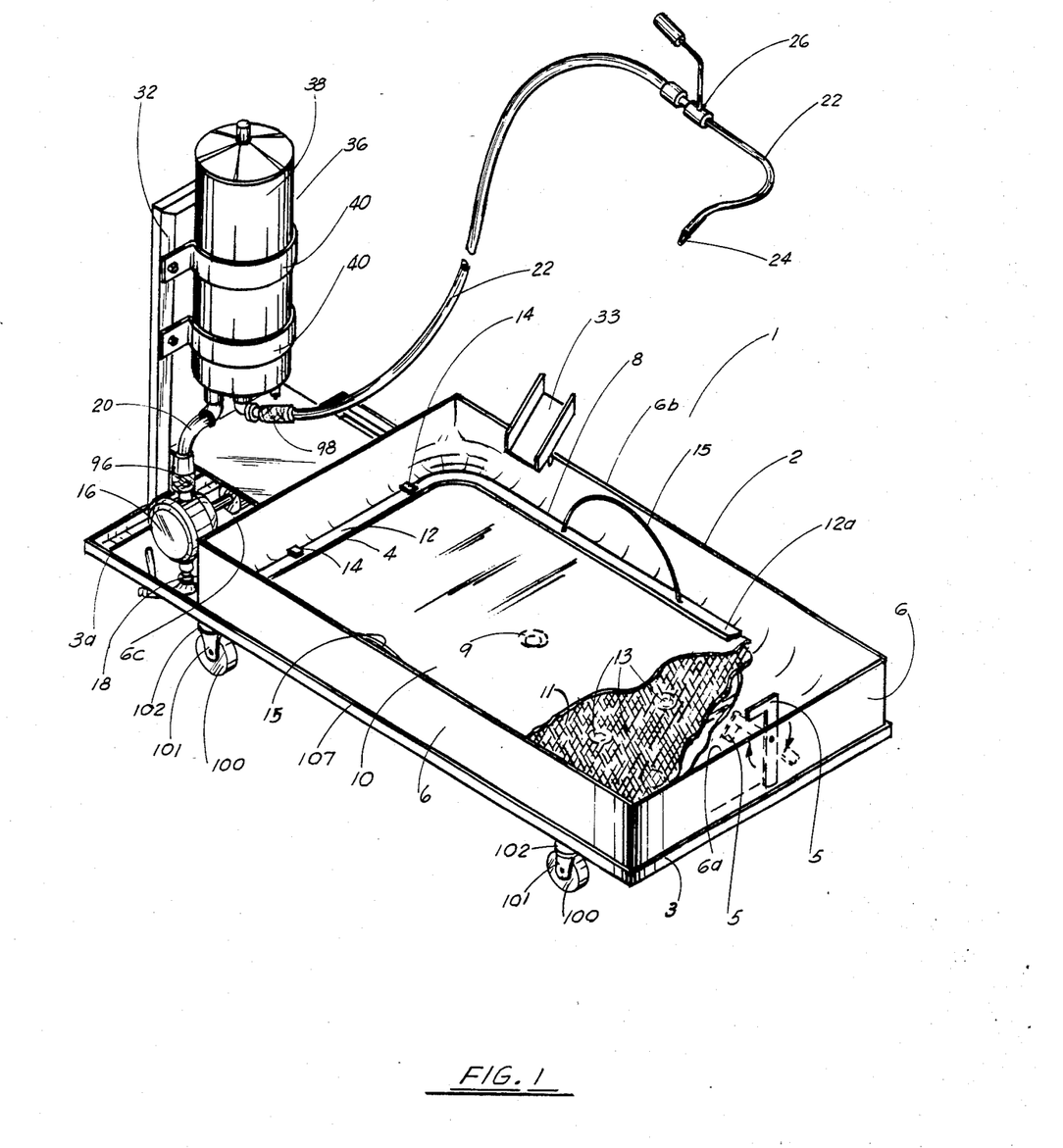
FIG. 1 is an isometric view of the entire dual-filtering apparatus of the present invention.
Figure 2:
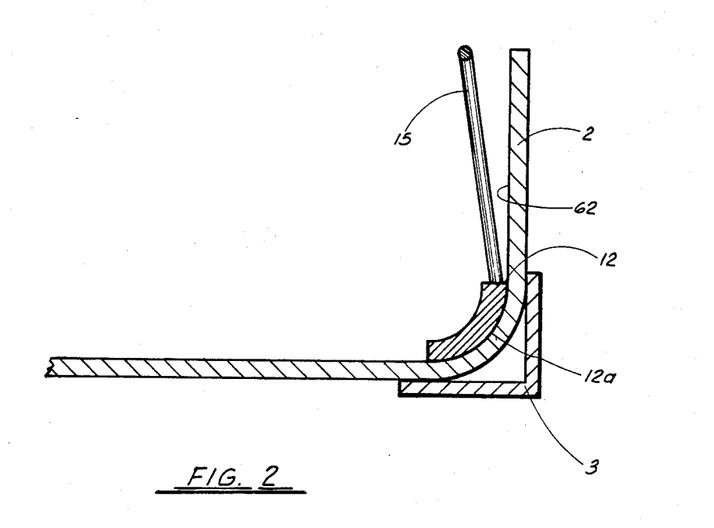
FIG. 2 is a cross-sectional view of the filter tub of the present invention taken from the lines A—A in FIG. 1.
Figure 3:
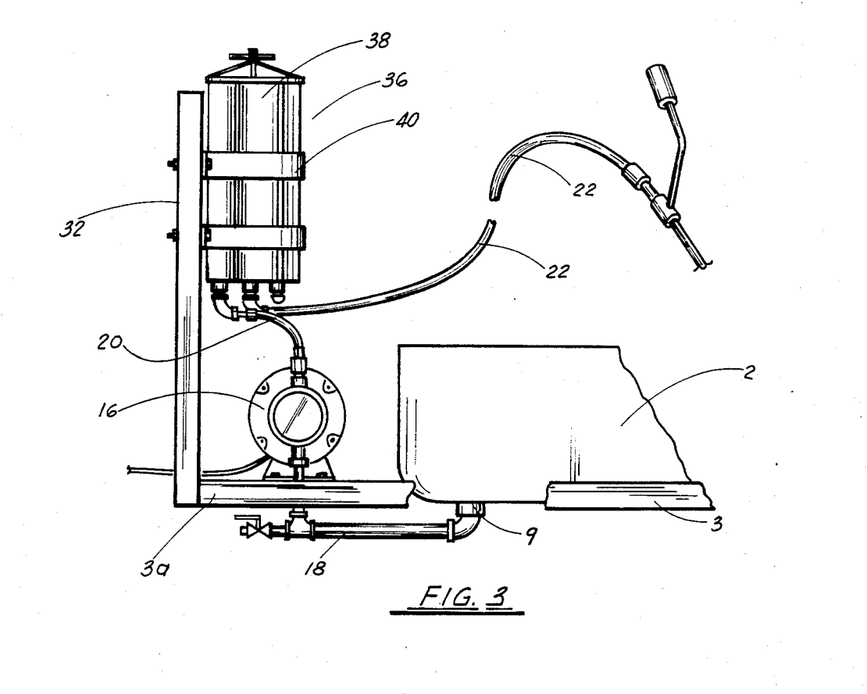
FIG. 3 is a partial, side, elevational view of the fine, upflow filtering assembly of the present invention.
Figure 4:
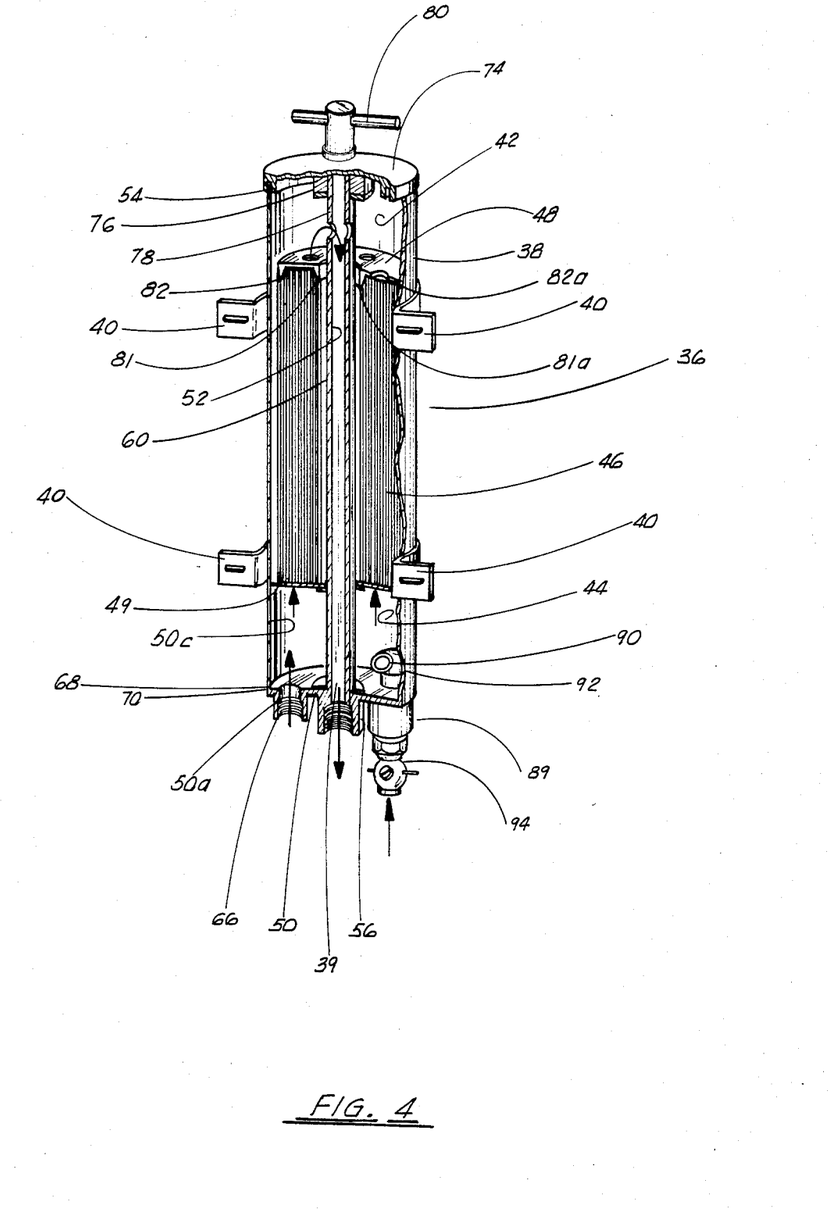
FIG. 4 is a side, cross-sectional, elevational view of the fine, upflow filtering assembly of the present invention, shown in isolation.

Referring to the drawings, and particularly to FIG. 1, a dual-filtering system for filtering hot cooking oils and/or fats used in deep fat frying operations, inter alia, is indicated generally by the numeral 1. In one of its aspects, filtering system 1 comprises a filter tub, indicated generally by the numeral 2, having a bottom wall 4 and upwardly extending side walls 6 defining a cavity 8, and having a drip scoop 33 suitably mounted to one side 6b thereof, to facilitate the draining of hot cooking oils and/or fats contained by deep frying vats (not shown, but located in close proximity to filter tub 2) therefrom into filter tub 2 for the obvious reason of filtering or purifying said edible oils and/or fats for re-use in said deep frying vats, inter alia. Filter tub 2 comprises a screen element 11 having a plurality of downwardly extending bubbles 13, or blisters 13, malled thereinto, mounted to the bottom wall 4 of filter tub 2, and maintained at some distance (i.e. the height of blisters 13) from bottom wall 4, thereby providing an increased surface area for filtration of said oils and/or fats, inter alia. Filter tub 2 further comprises a paper filter element 10, preferably composed of vegetable pulp (which has proven to be a more positive filtration medium) placed over screen element 11 in covering relationship thereto, wherein paper filter element 10 and screen element 11 are the bottom wall 4 of filter tub 2 by means of a retainer ring 12 which conforms to the bottom wall 4 of filter tub 2, as best seen in FIG. 2. A generally L-shaped handle 5 is hingedly mounted to the front wall 6a of filter tub 2, for movement between an operating position, wherein retainer handle 5 is pressed downwardly against the top surface of retainer ring 12, thereby further ensuring a fluid seal between the outer edge 12a of retainer ring 12 and the interior 6z of side walls 6 of filter tub 2, thereby preventing the bypassing of said oil therebetween, thereby ensuring that said oil is filtered by screen element 11 and paper filter element 10; and a non-functional position, wherein retainer handle 5 is swung upwardly out of its operating position, for facilitating removal of screen element 11 and paper filter element 10 from the bottom wall 4 of filter tub 2, for reasons which will hereinafter become obvious. A plurality of tabs 14 or nipples 14 are provided on back wall 6c of filter tub 2, to also further ensure the fluid seal between retainer ring 12 and the interior 6a of side wall 6 of tub 2. Filter tub 2 comprises a generally substantially central drain 9, or sump 9, which is fluidly connected by means of first conduit 18, or pump entry conduit 18, to the vacuum side of a combination vacuum/pressure pump 16, as best seen in FIG. 3, which is powered by any suitable source (not shown), wherein pump 16 and its power source are mounted to the outwardly extending portion 3a of frame 3 which supports filter tub 2. A plurality of wheels 100 are rotatably mounted within the yokes 101 of casters 102, which are attached by any suitable means to the bottom 107 of frame 3, thereby facilitating the easy, rolling movement or portability of filter tub 2, thereby ensuring that filter tub 2 can be placed in close enough proximity to said deep frying vats (not shown) to facilitate draining of said cooking oil from said vats into said filter tub 2. In another of its aspects, a novel fine filtering assembly, indicated generally by the numeral 36 in FIG. 1, comprising a generally cylindrical cannister 38 secured to a generally rectangular mounting bracket 32, which is attached on its bottom end by any suitable means to the outer end of extension 3a of frame 3, by means of braces 40, for example, wherein cannister 38 comprises, as best seen in FIG. 4, an upper void area 42, a lower void area 44, and a tightly-wound, paper filter element 46 mounted therein, by means of retainer plates 48, 49, for example, in fluidly sealing engagement to the inner walls of cannister 38. Paper filter element 46 is composed of highly refined, uniform, very dense, absorbent paper which has been approved by the USDA and FDA for use in filtering edible oils and fats, and which has been rolled with just enough pressure to achieve a certain tightness between plies to remove all solid particles from said oils and/or fats down to 1/10 of a micron in size. Cannister 38 further comprises a substantially central orifice 39 through its bottom wall 50 and an internal conduit 52 aligned therewith and extending upwardly to the top 54 of cannister 38, and being secured therein by retainer plates 48, 49, which are fixably attached to the interior side walls 50 of cannister 38, conduit 50c being journalled in orifice 60 provided throughout the entire length of paper filter element 46. Cannister 38 further provides a connector receptacle 56 on its exterior bottom wall 50a in alignment with orifice 48, receptacle 56 being machine-threaded for mating with preferably flexible delivery hose 22, or third conduit 22, which facilitates the transmission of the filtered oils and/or fats from cannister 38 into any suitable destination, which is usually said deep frying vats, for re-use thereof, as will hereinafter be clearly seen. Cannister 38 also further comprises another connector receptacle 66 provided near one side 68 of exterior bottom wall 50a thereof in alignment with orifice 70 provided through bottom wall 50 thereat wherein receptacle 66 is machine-threaded for mating with one end of second conduit 20, or filter pump conduit 20, which is fluidly connected on its other end to the pressure side of combination vacuum/pressure pump 16. Cannister 38 is fluidly, pressure-sealed on its top end 54 with cap 74 which comprises a downwardly extending, generally cylindrical boss 76, which is machine-threaded for mating with machined-threads provided at the top portion of internal conduit 52. A compression spring 78 is preferably circumferentially mounted on internal conduit 52 between the bottom surface of boss 76 and the top surface of upper retainer plate 48, for thereby making T-handle 80 of cap 74 spring-action. Further, upper retainer plate 48 comprises downwardly extending, generally wedge-shaped bevels 82 and 82a and 81 and 81a, wherein bevels 82 and 82a are preferably directed somewhat outwardly and wherein bevels 81 and 81a are preferably directed somewhat inwardly, for reasons which will hereinafter be discussed. Yet further, cannister 38 comprises a drain/valve assembly, indicated generally by the numeral 89, which comprises a conduit 90 which extends from the interior of cannister 38 to the exterior thereof through orifice 92 provided through the bottom wall 50 thereof, wherein conduit 90 is serially connected on its bottom end to a generally conventional check valve 94. The purpose of drain/valve assembly 89 will hereinafter be seen. It is important to note that second conduit 20 is connected by quick connect/disconnect coupling 96 to the pressure-side of pump 16, and that third conduit 22 is connected to receptacle 56 of cannister 38 by means of quick connect/disconnect coupling 98, for reasons which will also be hereinafter discussed. Additionally, at least a pair of generally semi-circular handles 15 are provided integral to the top surface of retainer ring 12 to facilitate removal of retainer ring 12 and paper filter element 10 and screen element 11 secured thereby, to facilitate the cleaning of filter tub 2, as will also be hereinafter discussed. Also, third conduit 22, or flexible delivery hose 22, preferably comprises a nozzle 24 at its outer end, and is also preferably provided with a handle-controlled check valve 26 for facilitating regulation of the flow of oil therethrough and for directioning of nozzle 24 towards any suitable location, which as hereinbefore discussed, will usually be said deep frying vats (not shown).

The upflow design of the fine filtering assembly 36 of the present invention enables removal of fine contaminate particles down to at least 1/10 of a micron in size, due to the pre-filtration, or sedimentation, of the coarser particles caused by the downward force of gravity acting upon the streaming flow of hot, (semi-filtered) oils and and/or fats being pumped through said second conduit 20 into lower void area 44 of cannister 38. Of course, paper filter element 46 is itself novel, and does perform the function of actually removing the finer particulates from the oil, better than any other device presently in existence, all as will hereinafter be clearly seen in the following description of the manner of operation of the present invention.

Figure 6:
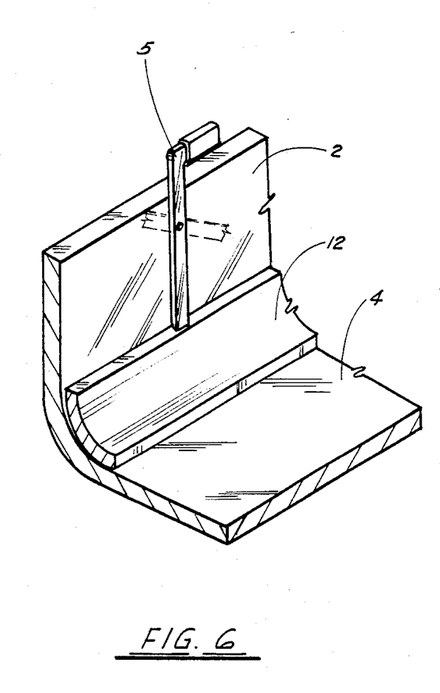
FIG. 6 is a fragmentary view of the operation of the generally L-shaped handle holding down the retainer ring of the present invention.
Figure 7:
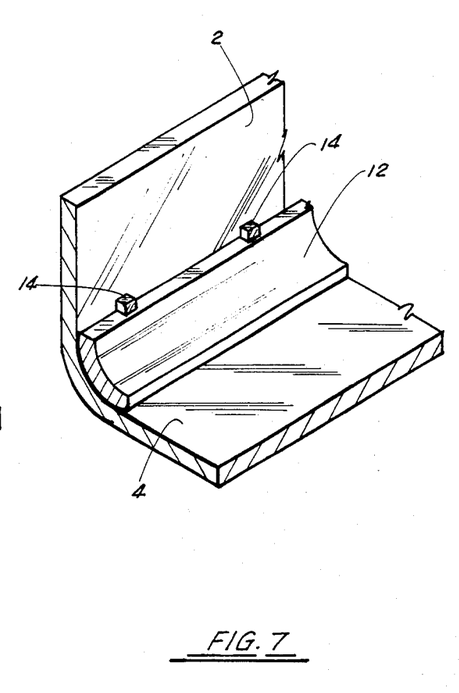
FIG. 7 is a fragmentary view of the tabs of the tub of the present invention holding down the retainer ring of the present invention.

In operation, the apparatus of the present invention works in the following manner:

A. Rolling filter tub 2 (which is, of course, facilitated by wheels 100 of frame 3 which supports tub 2) into close enough proximity to said deep fat frying vats (not shown) which contain undesirably contaminated cooking oils and/or fats, to facilitate the draining of said used, at least partially decomposed, dirtied, hot cooking oils and/or fats, from said deep fat frying vats (not shown), (utilizing drip scoop 33 suitably mounted to one side 6b of tub 2 to facilitate the draining procedure), into filter tub 2;

B. Actuating said suitable source for powering said combination vacuum/pressure pump 16, thereby causing pump 16 to first vacuum said cooking oil and/or fats through paper filter element 10 and screen element 11 which are secured to the bottom wall 4 of filter tub 2, and thence through drain 9, or sump 9, and through first conduit 18, or pump entry conduit 18, into the pressure side of combination vacuum/pressure pump 6—this filtering process effects the removal from said cooking oils and/or fats of all solid particles (e.g., flour, corn meal, fat from the food being deep fried in said deep fat frying vats) down to about 20–30 microns in size;

C. The pressure side of pump 16 then forces or conveys said oils and/or fats, which are now partially filtered as above described, upwardly through second conduit 20 or filter pump conduit 20, and through orifice 70 of cannister 38, and through lower void area 44, wherein by the natural action of downward gravitational force, much of the contaminates suspended in said oils and/or fats settle out of the flowing stream thereof; the pressure supplied by pump 16 is sufficiently strong to drive said oils and/or fats upwardly through novel, tightly-wound paper filter element 46 mounted within cannister 38, which paper filter element 46 is a specially formulated blend of different types of paper, rolled with just enough pressure to achieve a certain tightness between plys to effect removal of all solid particles from said oils and/or fats down to 1/10 of a micron in size, thereby substantially purifying said oils and/or fats for re-use;

D. The now purified or filtered oils and/or fats (which are not suitable for cooking purposes—i.e., are now a viable heat transfer medium) are thence delivered or conveyed through internal conduit 52 and substantially central orifice 39 of cannister 38, and through preferably flexible delivery hose 22, or third conduit 22, and through nozzle 24 thereof into any suitable destination, which will, of course, usually be said deep fat frying vats (not shown) for re-use thereof, after said deep fat frying vats have been suitably cleaned for deep fat frying operation;

E. It should be noted that this filtering apparatus of the present invention increases the useful life of said cooking oils and/or fats by two to three times, thereby ultimately resulting in increased efficiency of operation and reduction in the cost of operation commensurate with the cost of the cooking oil saved, which costs savings is substantial;

F. It is important to note that generally L-shaped handle 5, which is hingedly mounted to the front wall 6a of filter tub 2, is in its operating position during the above delineated procedure, thereby ensuring a fluid seal between the outer edge 12a of retainer ring 12 and the interior 6a of side walls 6 of filter tub 2, thereby preventing the bypassing of said oil therebetween, thereby ensuring that said oil is filtered by screen element 11 and paper filter element 10 before transmission to pump 16;

G. Further, upper retainer plate 48 comprises downwardly extending, generally wedge-shaped bevels 82, 82a, and 81 and 81a, wherein the upward force of said partially filtered cooking oils and/or fats being conveyed by the pressure side of pump 16 through second conduit 20, and through lower void area 44 of cannister 38 and paper filter element 46 causes bevels 82, 82a to force the outer perimeter of paper filter element 46 in fluidly sealing engagement to the interior side walls 50 of cannister 38 and simultaneously causes bevels 81 and 81a to force the inner perimeter of orifice 60 of paper filter element 46 into fluidly sealing engagement with internal conduit 52 of cannister 38, thereby ensuring that none of said cooking oils and/or fats bypass the filtering procedure by means of escaping, or seeping between the outer perimeter of paper filter element 46 and the inner walls of cannister 38 or between the inner perimeter of orifice 60 of paper filter element 46 and the outer perimeter of internal conduit 52 of cannister 38;

H. Generally semi-circular handles 13 provided integral to the top surface of retainer ring 12, are pulled upwardly to facilitate removal of retainer ring 12, thereby enabling the removal of paper filter element 10 and screen element 11 from the bottom wall 4 of filter tub 2, thereby facilitating the cleaning of filter tub 2, by means of hot water and a clean hand towel, for example, for subsequent re-use in the above-described manner;

I. It is important to note that filter tub 2 is preferably constructed of stainless steel, for facilitating the easy and effective cleaning thereof, without the necessity of soap, as this can contaminate and degrade the cooking oil;

J. Further, filter elements 10 and 11, and filter element 46 mounted within cannister 38 are preferably disposable and are easily replaceable, since disposable filters are favored over washable filter because if washable filters are not properly cleaned, the oil may be damaged rather than helped by filtration;

K. To facilitate the cleaning of cannister 38, the present invention provides a drain/valve assembly 89, which enables any fluid which has accumulated in lower void area 44 of cannister 38 to be expelled from the interior of cannister 38 to the exterior thereof through orifice 92 provided through the bottom wall 50 of cannister 38;

L. If it found desirable to utilize a single-filtering system, for example, in situations wherein the degree of filtration of said cooking oils and/or fats required is minimal, the operator (not shown) need merely disconnect third conduit 22 from receptacle 56 of cannister 38 by means of quick connect/disconnect coupling 98, and turn off the pressure side of vacuum/pressure pump 16, and then re-connect third conduit 22 on the end which was connected to receptacle 56 of cannister 38, to the outer end of pump entry conduit 18.

Figure 5:
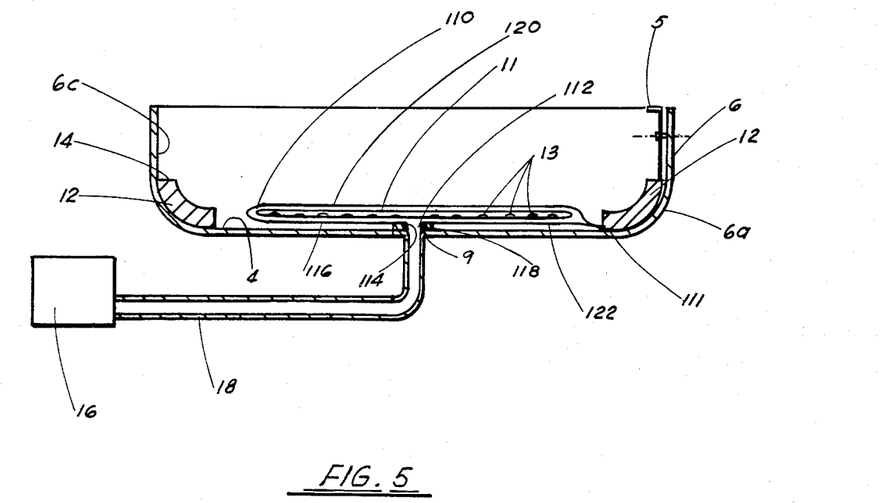
FIG. 5 is a cross-sectional, side elevational view of the filter tub of the alternative embodiment of the present invention.

The above and foregoing description of the present invention exclusively refers to a specific embodiment of the present invention, which for sake of brevity and clarity, will be termed the preferred embodiment of the present invention. However, the advanced dual-filtering system of the present invention further comprises an alternative embodiment, which, as best seen in FIG. 5, comprises an envelope-shaped paper filter bag 110, preferably made of vegetable pulp, for the reason heretofore assigned for paper filter element 10, which is open-ended at one end 111 thereof, and which encloses, or contains screen element 11, which comprises blisters 13, or bubbles 13, as heretofore described, and wherein open-end 111 of bag 110 is the only side, preferably, of bag 110 which is secured to the bottom wall 4 of filter tub 2 in fluidly sealing engagement to the interior 6a of side wall 6 thereof, by means of retainer ring 12, generally L-shaped handle 5, and further by means of a plurality of tabs 14 or nipples 14 provided on back wall 6c of filter tub 2, to also further ensure the fluid seal between retainer ring 12 and the interior 6a of side wall 6 of tub 2. In this alternative embodiment, screen element 11 further comprises an orifice 112 and a downwardly extending funnel 114 preferably integrally formed with the bottom surface 116 of screen element 11 in alignment with said orifice 112, wherein funnel 114 and orifice 112 are aligned with and fluidly communicate with drain 9, or sump 9 of tub 2. A gasket 118, preferably made of rubber, is mounted in fluidly sealing circumferential relationship to funnel 114 at the base thereof on the bottom wall 4 of filter tub 2, for thereby preventing the unregulated flow of contaminated cooking oils and/or fats between the outer surface of funnel 114 and the inner perimeter of of drain 9. In operation, the alternative embodiment of the present invention works in the following manner:

A. Pump 16 is actuated as described in the description of operation of the preferred embodiment, and said cooking oils and/or fats are first filtered by the top surface 120 of paper filter bag 110;

B. However, the contaminate particulates contained by said cooking oils and/or fats will quickly cover the top surface 120 of paper filter bag 110, thereby causing said cooking oils and/or fats to be directed downwardly underneath paper filter bag 110, wherein the vacuum created by pump 16 will cause said cooking oil and/or fats to be recirculated upwardly through the bottom surface 122 of paper filter bag 110 and then be suctioned through funnel 114 of screen element 11 and downwardly through paper filter bag 110 again, and through drain 9 of tub 2 and through first conduit 18, or pump entry conduit 18, to be further filtered in the manner above described in the description of the operation of the preferred embodiment of the present invention;

C. It is important to note that upon the recirculation of said cooking oils and/or fats through the bottom surface 122 of paper filter bag 110, the upward flow of said cooking oils and/or fats against the downward force of gravity, enables the downward gravitational force to cause the coarser particles to be pre-filtered, or sedimentate to the bottom wall 4 of filter tub 2, prior to being filtered by said filter bag 110, similar to the manner in which paper filter element 46 mounted within cannister 38 works (i.e., the upflow design).

While the above description of the preferred and alternative embodiment of the present invention was somewhat detailed, it will be apparent to those skilled in the art that many changes and modifications may be made without departing from the spirit of the present invention in its broader aspects.

What is claimed as invention is:

1. A dual-filtering apparatus for filtering and purifying contaminated oils, particularly edible cooking oils contained in deep fat frying vats used in deep fat frying operations, comprising:

a. a filter tub for receiving said contaminated oils from said deep fat frying vats;

b. at least one primary filtering means mounted in a covering relationship to the bottom wall of said tub;

c. tub sump means attached through the bottom wall of said tub for facilitating transmission of partially filtered oils from said tub;

d. a combination vacuum/pressure pump disposed adjacent to said tub for creating negative and positive pressure within the filter apparatus;

e. first conduit means connecting said tub sump means to said pump for conveying said partially filtered oils from said tub by a negative pressure created by the vacuum side of said pump;

f. a fine filtering assembly disposed upstream of said pump, fluidly communicating with a pressure side of said pump, said fine filtering assembly comprising a generally cylindrical cannister having inlet and outlet means through its bottom wall and a removable cap covering said cannister on the top; a central conduit means connected to a first outlet means for delivering finely purified oils back to said vats;

a perforated lower retainer plate fixedly attached to the central conduit of said cannister at a distance from said bottom wall and defining an annular lower sediment settlement area between said bottom wall and said lower retainer plate;

a perforated upper retainer plate mounted adjacent to the top cap of said cannister, said upper retainer plate and said cap defining an annular upper void area, which fluidly communicates with said central conduit;

a tightly wound fibrous filter element, mounted between said upper and lower retainer plates in surrounding relationship to said central conduit;

a second outlet means having a drain conduit means fluidly communicating with said lower sediment settlement area at one end and provided with a check valve at its other end, said second outlet means communicating with an exterior of said cannister through said drain conduit means;

a pair of compression sealing means fixedly attached to the upper plate in surrounding relationship to said central conduit and attached to said upper plate circumferentially around its periphery adjaacent the inner wall of said cannister in sealing engagement thereof;

g. a cannister inlet conduit means connecting said pump to said inlet means of said cannister for conveying said partially filtered oils from the pressure side of said pump into the lower sediment settlement area of said cannister for upflow filtration thereof, for thereby effecting removal of contaminated particles down to at least 1/10 of a micron in size from said oils;

h. a filtered oil conduit means connected on one end to said first outlet means of said cannister and open-ended on its opposite end for transporting the filtered oils from said cannister back to said deep fat frying vats for re-use;

i. an excess oil conduit means, connected to said second outlet means of said cannister, mounted above said filter tub for allowing excess oil and contaminants collected in the lower sediment settlement area to be expelled back to the filter tub for re-circulation in the filter system.

2. The apparatus of claim 1, wherein said filter tub is supported by a generally rectangular frame having an outwardly extending portion for supporting said combination vacuum/pressure pump, wherein said frame is provided with roller means for facilitating rolling movement of said frame and said tub and said pump, to any desired location to facilitate draining of said contaminated oils contained by said vats directly into said filter tub.

3. The apparatus of claim 2, wherein it further comprises a retainer ring, which is constructed to conform with the bottom periphery of said tub, mounted to the bottom periphery of said tub over the outer surface area of said filtering means mounted to the bottom periphery of said tub, in such a manner that such said retainer ring is in at least substantially fluidly sealing relationship to the interior walls of said tub, for thereby preventing the bypassing of said oils and/or fats between the outer edge of said filtering means and the interior walls of said tub.

4. The apparatus of claim 3, wherein said filter tub further comprises a generally L-shaped handle, wherein said handle is hingedly mounted to one side wall thereof for movement between an operating position wherein the bottom surface of said handle is in firm contact with the upper surface of said retainer ring, for thereby applying a downward force to said retainer ring, for thereby insuring a fluid seal between the exterior of said retainer ring and the interior walls of said tub, and an on-operating position, wherein said handle is swung upwardly out of contact with said retainer ring.

5. The apparatus of claim 3, wherein said filter tub further comprises a plurality of tabs fixedly attached to and extending outwardly from said side walls of said tub, in firm communication with the top surface of said retainer ring, for thereby applying a downward force to said retainer ring to ensure a fluid seal between said retainer ring and the interior walls of said tub.

6. The apparatus of claim 3, wherein at least one pair of said generally semi-circular handles are provided integral to the top surface of said retainer ring on opposite sides thereof to facilitate removal of said retainer ring, thereby to facilitate removal of said filtering means from the bottom surface of said filter tub.

7. The apparatus of claim 1, wherein said fine filtering assembly comprises:
  a. a generally cylindrical cannister having an upper void area, a lower void area, and a tightly-wound, paper filter element mounted therein;
  b. an upper retainer plate and a lower retainer plate fixably attached to the side walls of said cannister just above and just below said paper filter element, for thereby securing said paper filter element therebetween;
  c. a substantially central office provided through the bottom wall of said cannister;
  d. an internal conduit aligned with said orifice and extending upwardly to the top of said cannister, wherein said conduit is secured therein by means of said retainer plates, and wherein said conduit is further journalled in an orifice provided throughout the entire length of said paper filter element;
  e. a connector receptacle provided on the exterior bottom wall of said cannister in alignment with said orifice, whrein said receptacle is machine-threaded for mating with said third conduit means;
  f. a lateral orifice provided through the bottom wall of said cannister near one side thereof;
  g. a second connector receptacle provided near one side of the exterior bottom of said cannister in alignment with said lateral orifice, wherein said second connector receptacle is machine-threaded for mating with one end of said second conduit means, which is fluidly connected on its other end to the pressure side of said pump;
  h. a cap having a downwardly extending, generally cylindrical boss, which is machine-threaded for mating with machine-threads provided at the top portion of said internal conduit, whereby said cap thereby fluidly, pressure-seals the top end of said cannister;
  i. a compression spring circumferentially mounted to said internal conduit between the bottom surfaces of said boss and the top surface of said upper retainer plate;
  j. a T-handle operatively conncted to said boss of said cap, for thereby facilitating the screwing and unscrewing of said cap from said cannister;
  k. a drain/valve assembly, comprising a conduit which extends from the interior of said cannister to the exterior thereof through a third orifice provided through the bottom wall of said cannister, wherein conduit is serially connected on its bottom end to a check valve.

8. The apparatus of claim 7, wherein said upper retainer plate of said cannister comprises a plurality of downwardly extending, generally wedge-shaped bevels in communication with the top portionl of said paper filter element mounted within said cannister, wherein at least one bevel is provided thereat near each side of the interior walls of said cannister, and wherein at least one bevel is provided on the inner periphery of said orifice extending throughout said paper filter element mounted with said cannister near said internal conduit provided by said cannister.

9. The apparatus of claim 7 wherein said third conduit comprises a generally flexible hose having a nozzle at its outer end.

10. The apparatus of claim 9, wherein said third conduit is provided with a handle-controlled check valve for facilitating regulation of the flow of oil therethrough and for directioning of said nozzle towards any suitable location.

11. The apparatus of claim 1, wherein said primary filtering means comprises a perforated screen element having a plurality of downwardly extending bubbled malled thereinto, positioned on the bottom wall of said filter tub, said primary filtering means further comprising a paper filter element positioned on top of said screen element in covering relationship to the screen element and at least in partially covering relationship to the bottom wall of said filter tub; said paper filter element being secured to the bottom wall of said filter tub by means of a retainer ring, which conforms to the shape of the bottom wall of said filter tub.

12. The apparatus of claim 1, wherein said primary filtering means comprises a perforated screen element positioned between two layers of an envelope shaped paper filter element, said screen element and one of the paper layers having coaxially aligned apertures for allowing a partially filtered oil drain conduit to be inserted therethrough, said conduit having a sealing means mounted in surrounding relationship to said conduit to provide for sealing engagement of said drain conduit to the draining means of said tub; said paper filter element being secured to the bottom wall of said tub at least along one of its sides; said primary filtering means being mounted in said tub with an apertured filter layer adjacent the bottom wall of said tub.

* * * * *